United States Patent
Mio et al.

[11] Patent Number: 5,958,323
[45] Date of Patent: Sep. 28, 1999

[54] MANDREL OF HIGH FREQUENCY HEATING TYPE AND METHOD FOR PRODUCING CURED RUBBER HOSE USING SAME

[75] Inventors: Kotaro Mio; Akihiro Yamamoto; Sadahito Enomoto, all of Arida; Hideki Fujio, Himeji, all of Japan

[73] Assignees: Mitsubishi Cable Industries, Ltd.; Nichirin Co., Ltd., both of Hyogo, Japan

[21] Appl. No.: 08/919,168

[22] Filed: Aug. 28, 1997

[30] Foreign Application Priority Data

Aug. 29, 1996 [JP] Japan .................................. 8-229027

[51] Int. Cl.⁶ ........................... B29C 33/08; B29C 33/38
[52] U.S. Cl. ..................... 264/402; 249/115; 249/183; 264/236; 264/337; 264/338; 264/347; 425/174.8 E; 425/403; 425/470
[58] Field of Search ................ 425/174.8 R, 174.8 E, 425/403, 470, 471; 249/78, 115, 134, 175, 183; 264/337, 338, 402, 403, 209.2, 236, 347

[56] References Cited

U.S. PATENT DOCUMENTS

| | | |
|---|---|---|
| 4,140,461 | 2/1979 | Wiley et al. .............................. 425/470 |
| 4,145,176 | 3/1979 | Nelson ....................................... 249/78 |
| 4,347,487 | 8/1982 | Martin . |
| 4,443,679 | 4/1984 | Balordi .............................. 425/174.8 R |
| 4,747,992 | 5/1988 | Sypula et al. ............................. 249/183 |
| 5,262,591 | 11/1993 | Aldissi . |
| 5,293,001 | 3/1994 | Gebs . |
| 5,422,048 | 6/1995 | Kodama et al. ......................... 264/332 |

*Primary Examiner*—James P. Mackey
*Attorney, Agent, or Firm*—Wenderoth, Lind & Ponack, L.L.P.

[57] ABSTRACT

A mandrel of a high frequency heating type, comprising a conductive layer comprising a metal member having an aspect ratio of at least 100, in a proportion of at least 60% by volume, and a surface layer formed thereon which is made from an organic polymer, and a method for producing a rubber hose using the mandrel. Inasmuch as the inventive mandrel enables heating the curable rubber extruded on the mandrel, from the inner surface side thereof, the curing time of the rubber can be drastically reduced. Moreover, since the surface layer of the mandrel is composed of an organic polymer, the mandrel can be easily pulled out from the cured rubber layer. The production method of the present invention is free of the difficulty in heating the inside of the rubber layer. The concurrent application of external heating has accomplished continuous production of rubber hose.

11 Claims, 3 Drawing Sheets

MANDREL OF HIGH FREQUENCY HEATING TYPE AND METHOD FOR PRODUCING CURED RUBBER HOSE USING SAME

TECHNICAL FIELD OF THE INVENTION

The present invention relates to a mandrel of a high frequency heating type and a method for producing a rubber hose using said mandrel. More particularly, the present invention relates to a method for producing a rubber hose utilizing high frequency heating.

BACKGROUND OF THE INVENTION

A rubber hose has been conventionally manufactured by extruding a curable rubber from an extruder onto a mandrel made from an organic polymer to form a rubber layer, and curing the rubber layer by heating from the outside of the rubber layer. As a method for this end, a so-called batch method has heretofore been employed, which comprises extruding, on a mandrel, products in a continuous length having a curable rubber layer, and heating the same in the state of a bundle in a steam cure room for curing. This conventional method, nevertheless, is associated with the following problems.

(1) Low production efficiency because of non-continuous production.
(2) Possible batch-dependent variations in the properties and quality of the hose.
(3) Curling or bundling trace on a rubber hose after curing, due to heat-curing of extrusion products in a bundle state.

A rubber hose is used for various applications where high dimensional precision is required. The above-mentioned problems (2) and (3) often cause a failure to satisfy the requirement of high dimensional precision. Moreover, since the state and degree of curling (bundling trace) of the rubber hose can vary, attachment of a splicing fitting on both ends of a rubber hose may become difficult.

Although the demand for a continuous manufacture of rubber hose has long been felt in this field of art to solve the problems associated with the batch method, a continuous manufacture of rubber hose has not been industrially realized, as far as the present inventors are aware. This is because a rubber hose is generally thick, so that external heating from the outside of a rubber layer takes a long time until the thick rubber layer is sufficiently cured to the inside thereof, which in turn leads to the need of a large-scale continuous manufacturing apparatus and a large housing structure therefor.

SUMMARY OF THE INVENTION

It is therefore an object of the present invention to provide a mandrel enabling continuous industrial manufacture of cured rubber hoses, and a method for producing a rubber hose using said mandrel.

According to one aspect of the present invention, there is provided a mandrel to be heated by high frequency wave, which comprises a conductive layer comprising a metal member having an aspect ratio of at least 100, in a proportion of at least 60% by volume, and a surface layer formed thereon, which is made from an organic polymer.

According to another aspect of the present invention, there is provided a method for producing a cured rubber hose, comprising extruding a curable rubber on said mandrel to form a rubber layer, and heating said rubber layer from an inner surface side by a high temperature of the mandrel afforded by heating the conductive layer by high frequency wave.

DETAILED DESCRIPTION OF THE INVENTION

According to the mandrel of a high frequency heating type of the present invention (hereinafter to be referred to as an inventive mandrel), the conductive layer to be heated by high frequency wave comprises a metal member having an aspect ratio of at least 100 in a proportion of at least 60% by volume. In consequence, said metal member in the conductive layer has a high concentration density, so that the inventive mandrel itself can be heated quickly by high frequency wave, making a sharp contrast to the case where a metal powder having a low aspect ratio is used. As a result, a curable rubber extruded on the inventive mandrel can be heated at a high speed from the inner surface side thereof, thus markedly shortening the time necessary for curing the rubber, as explained in the following.

For the manufacture of a cured rubber hose by a predominant mandrel method, the mandrel should be pulled out off from the cured rubber layer. When the surface of the mandrel is formed from a metal member having an aspect ratio of at least 100, particularly one having many irregularities such as a metal fiber braids to be mentioned later, pulling out of the mandrel becomes extremely difficult because of poor slip characteristics at the interface between the mandrel and cured rubber layer. In contrast, the inventive mandrel has smooth surface layer made from an organic polymer, which facilitates pulling out of the inventive mandrel.

According to the method for manufacturing a rubber hose of the present invention, the use of the inventive mandrel enables heating of the rubber layer from the inner surface side of the mandrel by the heat afforded by high frequency wave. Therefore, the difficulty in heating the inside of the rubber layer, which has been the main cause of the extended time of conventional curing, can be resolved. When the rubber layer is heated from outside on demand, in addition to the heating from the inner surface side for curing, the rubber layer can be cured in a short time. As a result, continuous industrial production of rubber hose can be realized using a comparatively small-scaled continuous curing equipment, and the continuous curing in turn enables the manufacture of rubber hose free of curling (bundling trace).

Figure 1:
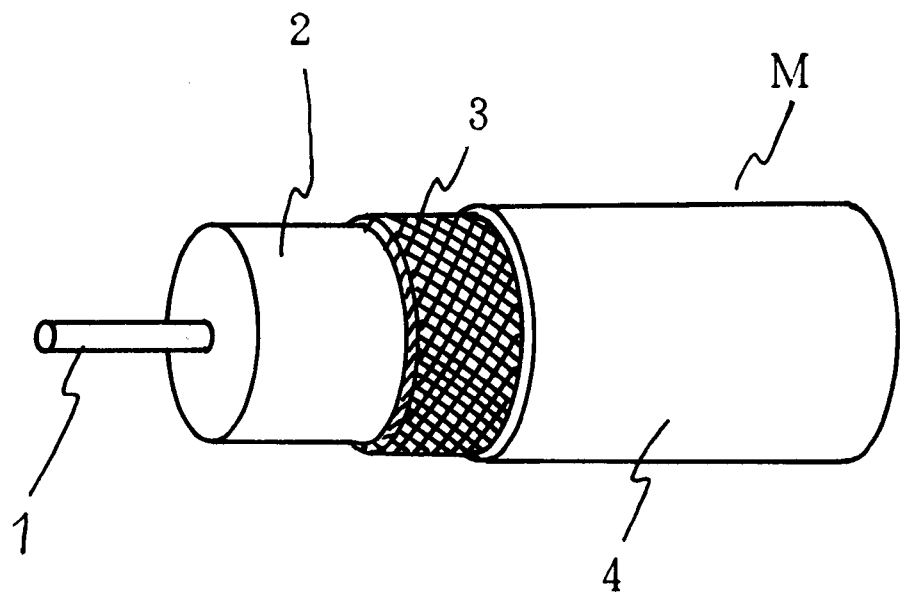
FIG. 1 is a perspective view of one embodiment of the mandrel of the present invention.
Figure 2:
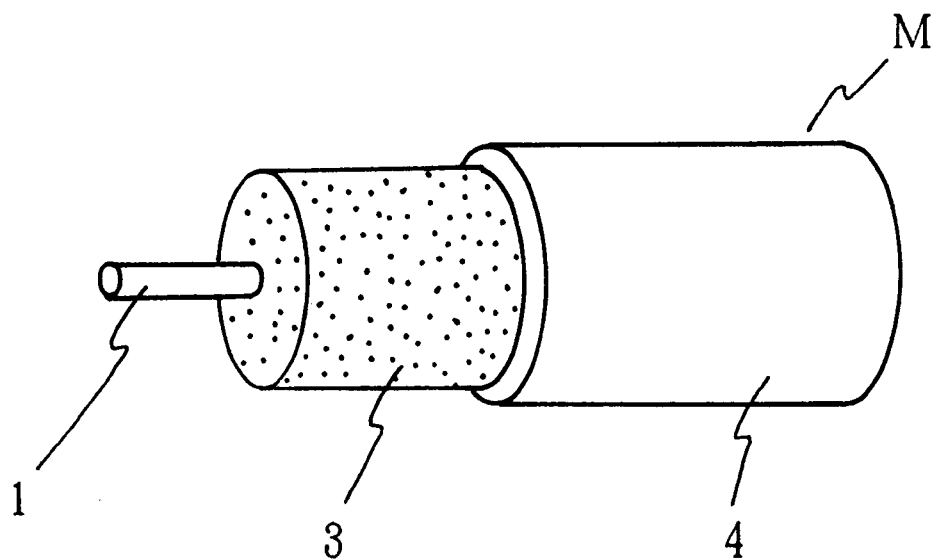
FIG. 2 is a perspective view of a different embodiment of the mandrel of the present invention.
Figure 4:
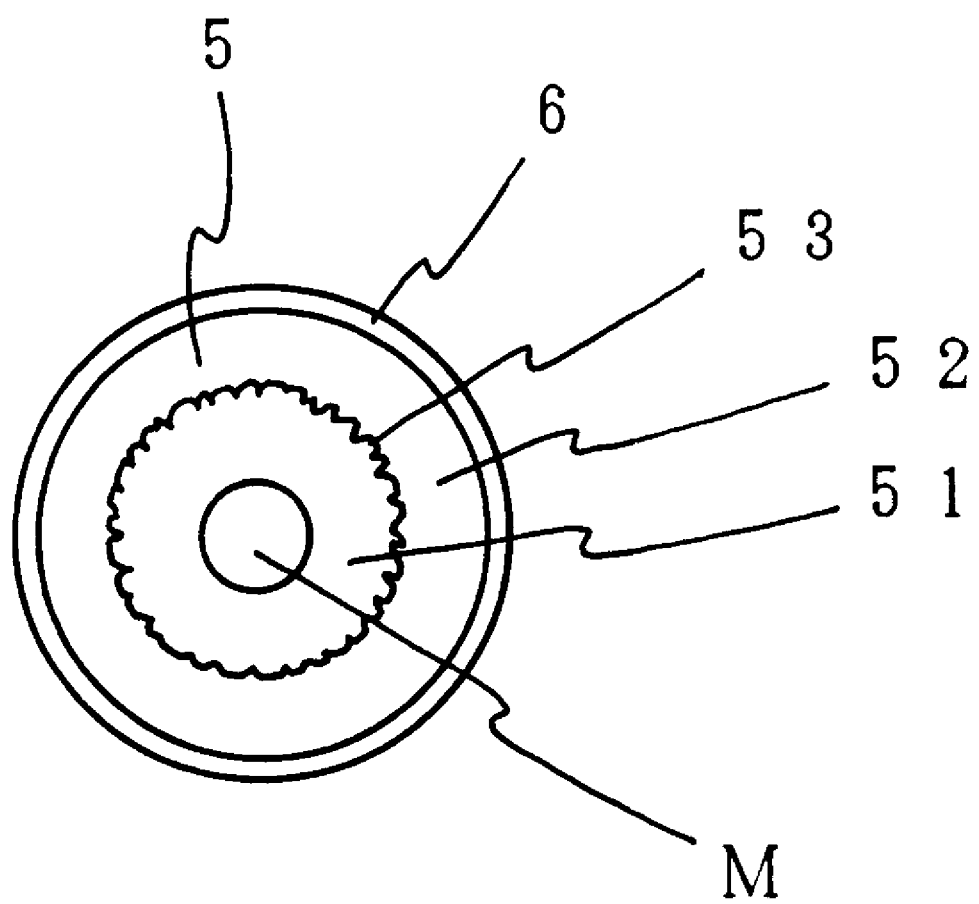
FIG. 4 is a cross sectional view along the line X—X of FIG. 3.

In FIGS. 1, 2 and 4, M shows an embodiment of the inventive mandrel, wherein a tension member 1 is set in the center of said mandrel, a core layer 2 is set on the tension member 1, a conductive layer 3 is formed on the core 2, a surface layer 4 is formed on the conductive layer, and a rubber layer 5 is formed on the mandrel M, said rubber layer ultimately becoming a rubber hose. The rubber layer 5 comprises a rubber inner layer 51, a rubber outer layer 52 and a braid layer 53 set therebetween. Layer 6 is an organic polymer layer for the inhibition of foaming, which is formed on the rubber layer 5 to inhibit foaming of the rubber layer 5 during curing. In FIG. 2, a thick conductive layer 3 is formed directly on the tension member 1.

In FIGS. 1 and 2, the tension member 1 is made of a member in continuous form, which has a high tensile strength, such as a strand of metal wires and polyamide fibers, and reinforces the tensile strength of the mandrel M.

In FIG. 1, the conductive layer 3 is made from an electrically conductive material and heated by high frequency wave. Such conductive material may be a metal member having an aspect ratio of at least 100. Various metals can be used to constitute said metal member, unless they have low melting point or are instable in the air. Particularly, a conductive metal having resistance to heat is preferable, with particular preference given to a metal having a melting point of at least 400° C., conductivity at normal temperature of at least $10^{-1}$ Ωcm, such as copper, nickel, iron, steel and aluminum.

The basic shape of the metal member made from the above-mentioned metal species may be, for example, of continuous form, such as fiber, whisker and wire; a planar one such as flake, shavings, flat sheet, flat particles and plate; and other shapes having a high aspect ratio. The aspect ratio of a member in continuous form is a ratio of an average length relative to an average sectional diameter in the direction perpendicular to the longitudinal direction of the long-shaped member, and the aspect ratio of the planar member is the ratio of an average surface area relative to an average thickness of the planar member. A metal member having an aspect ratio of less than 100, such as a typical powder, has a lower concentration density in the conductive layer, so that it cannot heat a mandrel effectively and thus fails to achieve the object of the present invention. Therefore, a metal member having an aspect ratio of at least 200, particularly at least 500, is preferably used in the present invention. A practically advantageous metal member is typically a processed product of the above-mentioned member having a basic shape. Examples thereof include a processed product of a member in a continuous length, such as braid, woven fabric, nonwoven fabric and expanded metal, and a processed product of a planar member, such as straight pipe and corrugated pipe. The above-mentioned member having a basic shape, such as flat particles and wire, particularly wire shavings, can be used as a composition containing same at a high concentration in an organic polymer and the like. Thus, the conductive layer 3 can be formed from a processed product of a member in a continuous length or planar member, or a mixture of one or more kinds of organic polymer compositions of flat particles and wire shavings.

The content of the metal member in the conductive layer 3 is at least 60% by volume, particularly at least 80% by volume. The conductive layer 3 is preferably composed solely of the above-mentioned processed product of a member in a continuous length or a planar member.

In the present invention, mandrel M is not necessarily flexible. As a practical problem, however, a long mandrel M is necessary when a long rubber hose is to be manufactured continuously. When a long mandrel is carried into the production site of the rubber hose while being wound around a drum or in a bundle, it is preferably flexible. Thus, the conductive layer 3 is preferably formed from a flexible processed product of a member in a continuous length, such as a braid or an expanded metal.

In FIG. 1, a core layer 2 corresponds to a core which defines the cross sectional shape and outer diameter of the mandrel M. It is made from various organic polymers having heat resistance enduring the high temperature of conductive layer 3 as heated by high frequency wave, such as those exemplified with regard to the surface layer 4 to be mentioned later.

The surface layer 4 is advantageously composed of various organic polymers having heat resistance enduring the high temperature of conductive layer 3 as heated by high frequency wave, and has a melting point, as determined by the method particularly defined in ASTM D 789, of at least 150° C., particularly at least 200° C., or a softening point, as determined by the method particularly defined in ASTM D 648, of at least 50° C., particularly at least 70° C. Examples thereof include polyolefins such as poly-4-methylpentene-1, polypropylene and polyethylene, polyamide, polyester, polysulfone, polyphenylene oxide, polyacetal, polyimide, polyamideimide, polyether ether ketone, thermoplastic elastomers and other heat resistant organic polymers.

The surface layer 4 is particularly preferably composed of poly-4-methylpentene-1 having superior releasability from a rubber hose and superior heat resistance.

The surface layer 4 need only have a thickness sufficient to hide the irregularities of the surface of the conductive material layer 3 and form a smooth surface. For example, when the layer 3 comprises a metal wire braid alone, the thickness is about 0.5–3 mm. The organic polymer constituting the surface layer 4 may contain an inorganic solid in a proportion of about 1–50 wt % to improve the heat conductivity of the surface layer 4. The inorganic solid is exemplified by talc, clay, alumina oxide, calcium carbonate, titanium oxide and the like. When a surface layer 4 having particularly superior surface smoothness is required, the total amount of the inorganic and/or organic solid component which may be contained in said layer 4 should be not more than 1 wt %. It is preferable that a solid component be not contained.

The conductive layer 3 in FIG. 2 comprises, as a conductive material, the above-mentioned member having a basic shape, such as flat particles and wire shavings, and the layer 3 is formed from a composition of said member having a basic shape and an organic polymer. The conductive material in the layer 3 is heated by high frequency wave. The organic polymer in the layer 3 may be of the same kind as the material constituting core 2 in the embodiment of FIG. 1. The content of the conductive material, i.e., a member having a basic shape, is at least 60% by volume, preferably at least 80% by volume, of said organic polymer composition. The conductive layer 3 of FIG. 2 also functions as the core layer 2 of FIG. 1. The material constituting the surface layer 4 of FIG. 2 may be the same as that in the embodiment of FIG. 1.

In the present invention, a cured rubber hose is manufactured by extruding a curable rubber on the above-mentioned mandrel M to form an uncured rubber layer (which becomes the production objective rubber hose), and heating said rubber layer from the inner surface side by a high temperature heat of the mandrel afforded by heating the conductive layer by high frequency wave. An uncured rubber layer may be cured by the high temperature of the mandrel alone. A suitable conventional heat curing system may be concurrently applied from outside, such as a wet system (e.g., steam curing) and a dry system (e.g., salt bath curing under ordinary pressure or under pressurization, high temperature nitrogen cure, infrared ray cure and heat curing using a long land die). In this case, heating from the rubber layer inner surface side by high frequency heating is preferably applied in advance of the above-mentioned heating from outside layer.

When curing under ordinary pressure by a heat curing means, such as salt bath, is desired, an organic polymer layer for inhibiting foaming is preferably formed on the uncured rubber layer, to inhibit undesired foaming of the rubber due to water and residual curing agent in the rubber layer. An organic polymer suitable for this end is heat resistant and has a melting point, as determined by the method particularly defined in ASTM D 789, of at least 150° C., particularly at least 200° C., or a softening point, as determined by the method particularly defined in ASTM D 648, of at least 50° C. For example, polyolefins such as poly-4-methylpentene-1, polypropylene, polyethylene, polyamide, polyester, polysulfone, polyphenylene oxide, polyacetal, polyimide, polyamideimide, polyether ether ketone, thermoplastic elastomers and the like, are used. Of these, poly-4-methylpentene-1 is particularly preferable. The organic polymer layer for inhibiting foaming has a thickness of about 2–5 mm, though subject to variation depending on the softening point, melting point and modulus at heating temperature of the organic polymer constituting said layer.

Figure 3:
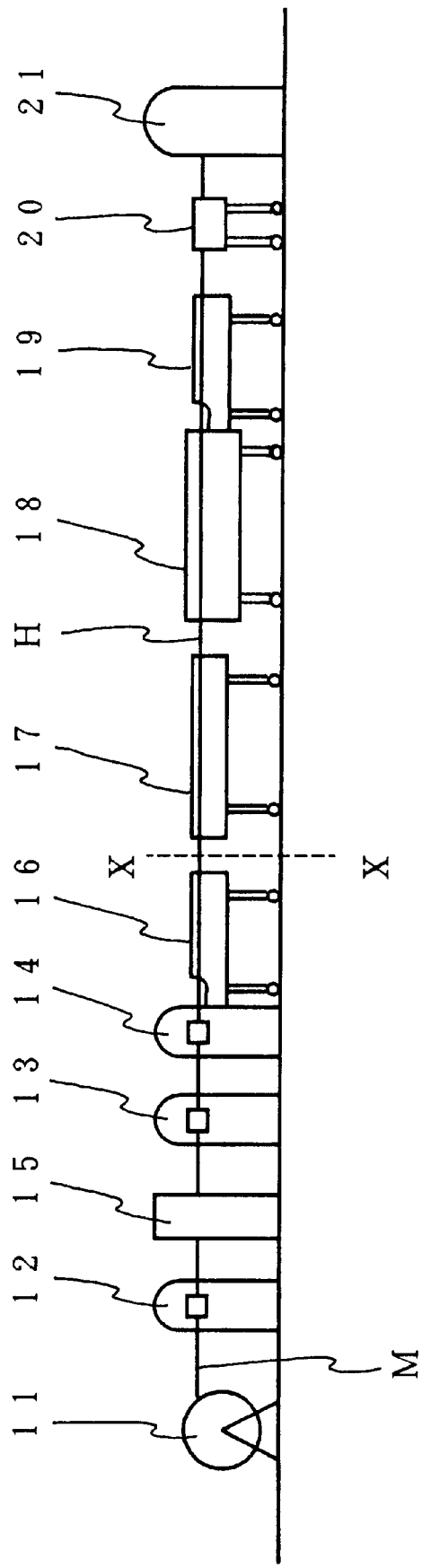
FIG. 3 is a side view of a continuous curing equipment used in the inventive method of manufacturing a rubber hose.

FIG. 3 shows a side view of a continuous curing equipment for a combined use with high frequency heating and ordinary pressure salt bath heating, inclusive of a mandrel M supply drum 11, extruders 12–14, a braiding machine 15, a water cooling apparatus 16, a high frequency heating apparatus 17, an ordinary pressure salt bath 18, a water cooling-rinsing apparatus 19, a stripper 20, and a winding apparatus 21. As shown in FIG. 3, the mandrel M is continuously delivered from the supply drum 11 and continuously runs from extruder 12 to stripper 20, wound up by the winding apparatus 21, and heated to a high temperature during the passage through high frequency heating apparatus 17.

In FIGS. 3 and 4, the curable rubber composition constituting the rubber hose is extruded on the mandrel M by the extruder 12 to form a rubber inner layer 51. On the rubber inner layer 51 is formed, for example, a polyester braid layer 53 by the braiding machine 15. Then, a rubber outer layer 52 is formed on the braid layer 53 by the extruder 13, whereby the rubber layer 5 can be obtained. The rubber layer 5 comprising the above-mentioned layers 51, 52 and 53 formed on the mandrel M becomes the objective rubber hose after curing. Then, the organic polymer layer 6 for inhibiting foaming is formed on the rubber outer layer 52 by the extruder 14. The foam-inhibiting layer is cooled with water in the water cooling apparatus 16.

A continuously running member H which has passed through the water cooling apparatus 16 now has the rubber layer 5 formed on the mandrel M, on which the organic polymer layer 6 for inhibiting foaming is formed, as shown in FIG. 4. The rubber layer 5 is heated from the inner surface side by mandrel M while running with the mandrel M which has been heated to a high temperature by the high frequency heating apparatus 17, to the extent that curing may be initiated in some cases. The layer 5 is heated from outside in the ordinary pressure salt bath 18. As a result, the entire rubber layer 5 is extremely efficiently heated in a short time by the heat sources outside and inside thereof, and sufficiently cured in a short time. Each layer on the mandrel M is cooled with water by the water cooling and washing device 19, whereby molten salt attached to the surface of the outermost layer 6 for inhibiting foaming is removed by dissolution. The stripper 20 strips off the outermost layer 6 for inhibiting foaming. The mandrel M having the cured rubber layer 5 is wound up by the take-up apparatus 21.

The integral body of the mandrel M and cured rubber layer 5 formed thereon is cut into pieces having a suitable length. The mandrel M is pulled out by a conventional method, whereby a cured rubber hose is obtained. In the present invention, the mandrel M has a smooth surface made from an organic polymer. Thus, it shows superior releasability from the cured rubber layer 5 to facilitate this pulling out step.

According to the present invention, the mandrel M is heated by the high frequency heating apparatus 17 at a desired point before reaching the extruder 14, such as in the supply drum 11, between the supply drum 11 and the extruder 14 or during external curing using a curing device of the ordinary pressure salt bath 18, besides as shown in the embodiment of FIG. 3.

EXAMPLE 1

A fiber strand of KEVLER® (aromatic polyamide fiber manufactured by Toray-Du Pont) was used as a tension member. Thereon were formed successively an extruded layer of poly-4-methylpentene-1 (TPX, trademark, MITSUI PETROCHEMICAL INDUSTRIES, LTD.) having an outer diameter of 7.0 mm, a conductive layer made from a stainless wire braid having a braid density (percentage of the surface area occupied by the material constituting the braid relative to the entire surface area of the braid) of 90 and an outer diameter of 8.6 mm, wherein the amount of the stainless wire braid in this layer was 90% by volume and the rest was clearance, and an extruded layer of poly-4-methylpentene-1 (same as above) having an outer diameter of 14.0 mm to give a mandrel.

The mandrel was run through the continuous curing equipment shown in FIG. 3, during which time a curable rubber composition containing ethylene-propylene-diene terpolymer rubber containing dicumylperoxide was extruded thereon. A polyester fiber braid was applied, and a curable rubber composition same as above was extruded thereon to form a rubber layer. A 3 mm thick layer of poly-4-methylpentene-1 (same as above) was formed thereon.

The mandrel was retained at a high temperature of about 180° C. by a high frequency heating apparatus set before the ordinary pressure salt bath. The curable rubber composition layer thereon was heated for about 0.3 minute by the mandrel and heated at 190° C. for about 2 minutes in the ordinary pressure salt bath, followed by water cooling and removal of poly-4-methylpentene-1 layer, whereafter wound around a take up drum.

The integral body of the mandrel and cured rubber layer thus obtained was cut at 110 m intervals. A high water pressure of 50 kg/cm$^2$ was applied to one end of the cut product to push out the mandrel. Thus, a cured rubber hose was obtained which had an inner diameter of 14.4 mm, outer diameter of 22 mm, and the above-mentioned braid in about the middle of the rubber layer.

EXAMPLE 2

In the same manner as in Example 1 except that a poly-4-methylpentene-1 layer was not formed on the rubber layer and high pressure steam curing apparatus (steam temperature 190° C.) was used instead of the ordinary pressure salt bath, a cured rubber hose was obtained which had an inner diameter of 14.4 mm, outer diameter of 22 mm, and the above-mentioned braid in about the middle of the rubber layer.

The inventive mandrel can be heated to a high temperature by high frequency wave, thereby enabling heating of the curable rubber extruded on said mandrel, from the inner surface side thereof. Consequently, the curing time of the rubber can be drastically reduced. Moreover, since the surface layer of said mandrel is composed of an organic polymer, the mandrel can be easily pulled out from the cured rubber layer.

According to the production method of the rubber hose of the present invention, moreover, the use of the above-mentioned mandrel removes the difficulty in heating the inside of the rubber layer, which has been the main cause of elongated curing time in conventional techniques. The concurrent application of external heating has accomplished continuous production of a rubber hose free of undesired curling (bundling trace) found with the conventional batch curing method.

This application is based on application No. 229027/1996 filed in Japan, the content of which is incorporated hereinto by reference.

What is claimed is:

1. A mandrel of a high frequency heating type for the manufacture of a cured rubber hose, comprising a conductive layer comprising a metal member having an aspect ratio of at least 100, in a proportion of at least 60% by volume, and a surface layer formed thereon which is made from poly-4-methylpentene-1, wherein the mandrel has flexibility.

2. The mandrel of claim 1, wherein the metal member in the conductive layer is a metal wire braid.

3. The mandrel of claim 1, wherein the surface layer contains an inorganic solid.

4. The mandrel of claim 1, wherein the surface layer contains an inorganic solid in a proportion of not more than 1 wt %.

5. The mandrel of claim 2, wherein the surface layer contains an inorganic solid.

6. The mandrel of claim 5, wherein the inorganic solid is present in a proportion of not more than 1 wt %.

7. A method for producing a cured rubber hose, comprising extruding a curable rubber on the mandrel of claim 1, to form a rubber layer on said mandrel, and heating the rubber layer from the inner surface side thereof by heating the mandrel using a high frequency wave, to produce the cured rubber hose.

8. The method of claim 7, further comprising heating the rubber layer on the mandrel from an outer surface side of the rubber layer.

9. The method of claim 8, wherein the mandrel is heated before said heating the rubber layer from the outer surface.

10. The method of claim 7, further comprising forming, on the rubber layer, an organic polymer layer for inhibiting foaming, and heating the rubber layer from an outer surface side of the organic polymer layer.

11. The method of claim 9, further comprising forming, on the rubber layer, an organic polymer layer for inhibiting foaming, and heating the rubber layer from an outer surface side of the organic polymer layer.

* * * * *